March 29, 1949.  H. M. BRAMBERRY  2,465,427

PISTON RING TOOL THIMBLE

Filed June 10, 1947

INVENTOR.
HARRY M. BRAMBERRY
BY
Scrivener & Parker
ATTORNEYS

Patented Mar. 29, 1949

2,465,427

UNITED STATES PATENT OFFICE 2,465,427

PISTON RING TOOL THIMBLE

Harry M. Bramberry, New Castle, Ind.

Application June 10, 1947, Serial No. 753,768

2 Claims. (Cl. 29—222)

1

This application is a continuation-in-part of the application which matured into United States Letters Patent No. 2,444,975, granted July 13, 1948.

This invention relates to piston ring tools and, more particularly, to a tool for applying or removing piston rings to or from the ring-receiving grooves of pistons. Various devices have heretofore been proposed for applying and removing piston rings to and from pistons by spreading the ends of the rings apart in order that the ring may be slipped over the piston. My invention relates to piston ring tools of this general type and has had for its principal object the provision of such a tool which may be used to grasp and expand piston rings of all sizes and types, and particularly those known in the art as "thick wall top compression rings" which are so constructed that their free ends cannot be moved out of the ring groove to a position external of the outer wall of the lands of the piston by sliding the ring sideways in the groove, i. e. at right angles to the axis of the piston. Another object of the invention has been to provide a piston ring expanding tool of utmost simplicity of design, manufacture and operation.

Other objects and features of novelty of the invention will be made apparent by the following description and the annexed drawings, it being understood, however, that such description and drawings are only illustrative of the invention and impose no limitation thereon not imposed by the appended claims.

Figure 1:
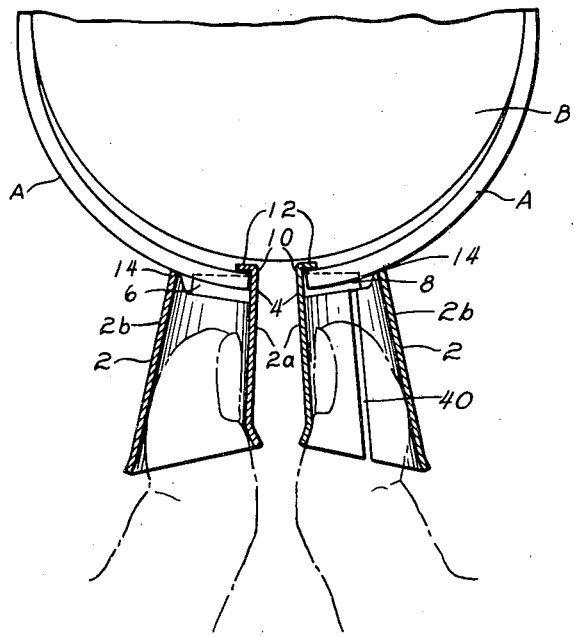
Figure 2:
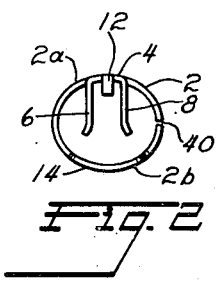
Figure 4:
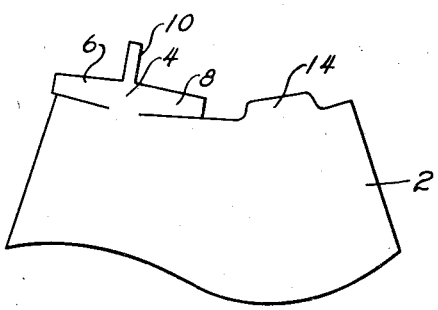
Figure 3:
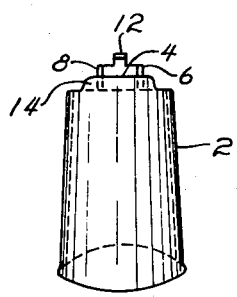

Referring to the drawings, in which similar reference numerals refer to like parts, Fig. 1 is a top view of a piston showing a piston ring tool according to a preferred embodiment of this invention being used to remove or apply a piston ring thereto;

Figs. 2 and 3 are top and back views of one of the piston ring tools shown in Fig. 1, and Fig. 4 is a plan view of a blank from which the device of Figs. 1, 2 and 3 may be formed.

My invention comprises a pair of thumb-receiving thimbles each having a hook part thereon for engaging the end and inner surface of a piston ring. In removing a ring from a piston, these thimbles are placed on the two thumbs of an operator and the two hook parts are placed back-to-back between the two ends of the piston ring with parts of each hook firmly in engagement respectively with an end of the ring and the inner surface thereof adjacent the end, after which the operator, by pulling in opposite directions on the two ends of the ring, may expand the same and remove it from the piston.

2

In placing a ring on a piston the two thimbles are used in the same manner to engage and expand the two ends of the ring.

The preferred form of my invention is disclosed in Figs. 1, 2 and 3 and comprises a pair of devices each of which is of unitary construction and is formed from the sheet metal blank shown in Fig. 4. Each of these devices comprises a generally cylindrical thumb-receiving thimble part 2 which, when on the thumb, has a part 2a adjacent and overlying the thumb-nail and a part 2b adjacent and overlying the ball of the thumb. At the outer end of the part 2a of the thimble (i. e. the end which is adjacent the piston ring when the device is in use) there is formed a narrow part 4 forming an extension of the part 2a and having two wings 6, 8 turned at approximately right angles from its sides across the end of the thimble, forming with the part 4 a U-shaped cup for the reception of the end of a piston ring. A narrow piece 10 extends from the end edge of part 4 at approximately the center thereof and in the plane of part 4 and is turned at right angles toward the part 2b of the thimble as a tang 12, forming an inwardly-turned hook. The ring end engaging part 4 is of such width that the wings 6, 8 are spaced apart sufficiently to receive an end of the widest ring with which the tool is designed to be used, while the part 10 and the tang 12 are of such width that they will enter the narrowest groove with which the tool is designed to be used. The outer end edge of part 2b of the thimble is extended beyond the outer end edge of the other parts of the thimble, as shown at 14 in the drawings, for a purpose to be described.

As is well-known in the art, some piston rings are of such size with respect to the piston and the ring groove therein that they cannot be moved laterally in the groove sufficiently to cause the ends thereof to be outside of the outer surface of the wall of the piston lands. In order to permit the tool according to this invention to be operative to engage and remove such rings the projecting part 10 and the tang 12 thereon must be extended substantially beyond the outer edge of part 4 and the outer or upper edges of the wings 6, 8 in order that the hook consisting of the parts 10, 12 may be inserted into the ring groove and engaged with the under surface of the ring. As the preferred form of the invention is constructed in this way it has been so disclosed in the drawings of this application.

In the use and operation of the tool to remove a piston ring of usual size and type, the piston ring to be removed is first slid laterally in the ring groove until the ends are outside of the outer wall of the piston. The two thimbles are placed on the two thumbs of an operator in the manner shown in Fig. 1. While the ring is held in the described position by the index fingers, the ring-end receiving part of each thimble is placed over one end of the ring, with the wall 4 in engagement with an end face of the ring, the tang 12 under the end of the ring, the wings 6, 8 on opposite sides of the ring and the abutment part 14 engaging the outer surface of the ring at a point removed from the end thereof, all as shown in Fig. 1. The thimbles are now moved to cause the tangs 12 to pull radially outwardly on the ends of the ring, in which operation the points of engagement between the abutments 14 and the outer surface of the ring form fulcrums about which the tangs move outwardly to expand the ring. When the ring has been sufficiently expanded in this manner it may be slipped over the piston and removed therefrom.

Each thimble is formed from a flat sheet metal blank in such a way that a space 40 is left between the ends of the curved piece of metal, by reason of which the size of each thimble may be changed, by expanding or contracting the opening 40, in order to adjust the size of the thimble to the thumb of the operator. In order to permit this the blank is preferably formed from annealed spring steel stock before hardening.

While I have described and illustrated only a single embodiment of the invention, it will be apparent to those skilled in the art that other embodiments, as well as modifications of that disclosed, may be made without departing in any way from the spirit or scope of the invention as defined by the appended claims.

What is claimed is:

1. An open ended tubular body forming a thimble and having a hook at one end thereof comprising a part projecting in substantial prolongation of the wall of the body and an inwardly turned part at the outer extremity thereof, spaced substantially parallel guides attached to the same end of the body as the hook and being substantially parallel to and on opposite sides of the inwardly turned part, and means at the same end of the body as the hook and diametrically opposite therefrom forming a fulcrum part.

2. A thimble according to claim 1 in which the inwardly projecting part is spaced outwardly from the guides and is narrower than the space between the guides.

HARRY M. BRAMBERRY.

REFERENCES CITED

The following references are of record in the file of this patent:

UNITED STATES PATENTS

| Number | Name | Date |
|--------|------|------|
| 319,070 | Clark | June 2, 1885 |
| 1,616,621 | Hooks | Feb. 8, 1927 |
| 2,444,975 | Bramberry | July 13, 1948 |

FOREIGN PATENTS

| Number | Country | Date |
|--------|---------|------|
| 44,103 | Holland | Sept. 15, 1938 |